United States Patent [19]
Abe

[11] Patent Number: 5,784,355
[45] Date of Patent: Jul. 21, 1998

[54] INFORMATION RECORDING METHOD AND DEVICE

[75] Inventor: Michiharu Abe, Yokohama, Japan

[73] Assignee: Ricoh Company, Ltd., Tokyo, Japan

[21] Appl. No.: 940,726

[22] Filed: Sep. 30, 1997

Related U.S. Application Data

[63] Continuation of Ser. No. 528,081, Sep. 14, 1995, abandoned.

[30] Foreign Application Priority Data

| Sep. 22, 1994 | [JP] | Japan | 6-227517 |
| Nov. 15, 1994 | [JP] | Japan | 6-280132 |
| Dec. 16, 1994 | [JP] | Japan | 6-312839 |

[51] Int. Cl.$^6$ .................................................. G11B 7/00
[52] U.S. Cl. ........................... 369/116; 369/54; 369/58; 369/13
[58] Field of Search .................... 369/116, 54, 13, 369/109, 110, 58, 53, 59, 60, 47, 48, 49

[56] References Cited

U.S. PATENT DOCUMENTS

| 4,829,499 | 5/1989 | Abe . | |
| 5,105,416 | 4/1992 | Segawa . | |
| 5,226,031 | 7/1993 | Abe . | |
| 5,239,531 | 8/1993 | Abe . | |
| 5,241,524 | 8/1993 | Lee . | |
| 5,331,612 | 7/1994 | Murakami et al. | 369/116 X |
| 5,396,480 | 3/1995 | Morishita et al. . | |
| 5,430,696 | 7/1995 | Tokita et al. | 369/116 X |
| 5,459,701 | 10/1995 | Tokita et al. | 369/116 X |

FOREIGN PATENT DOCUMENTS

| 0597656 | 5/1994 | European Pat. Off. . |
| 63-848 | 1/1988 | Japan . |
| 63-113938 | 5/1988 | Japan . |
| 1184631 | 7/1989 | Japan . |
| 231329 | 2/1990 | Japan . |

OTHER PUBLICATIONS

European Search Report, dated Dec. 22, 1995.
European Patent Office, Patent Abstracts of Japan, Abstract of Japanese Publication No. JP4141826, published May 15, 1992.

*Primary Examiner*—Muhammad N. Edun
*Attorney, Agent, or Firm*—Cooper & Dunham LLP

[57] ABSTRACT

A method of recording a bit stream on a Phase Change media by illuminating a laser beam on the Phase Change media includes assigning a predetermined number of channel bits to each bit of the bit stream, and assigning one of a highest power level, an intermediate power level, and a lowest power level of the laser beam to each of the channel bits so as to modulate the laser beam, wherein an arrangement of the highest power level, the intermediate power level, and the lowest power level for one bit of the bit stream depends on values of the one bit and an immediately preceding bit.

44 Claims, 13 Drawing Sheets

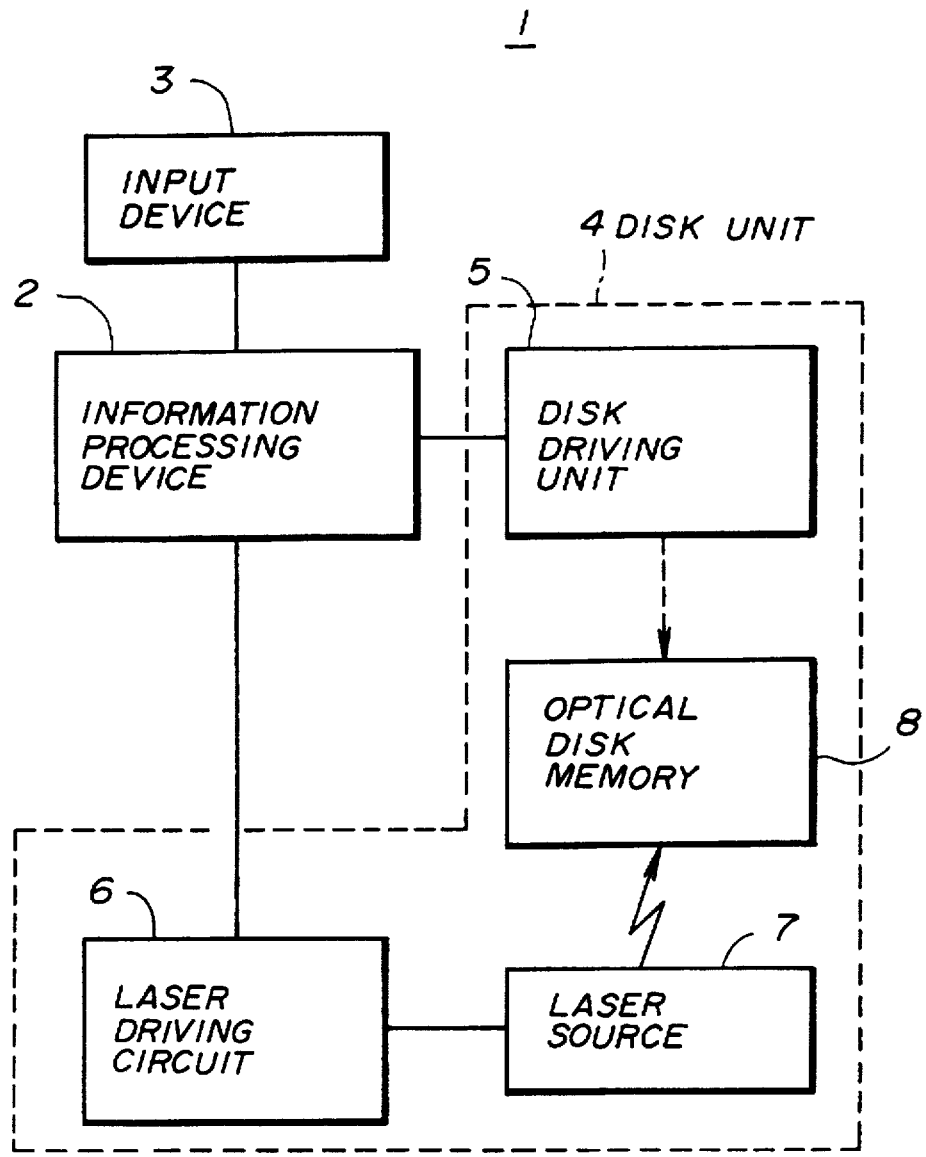

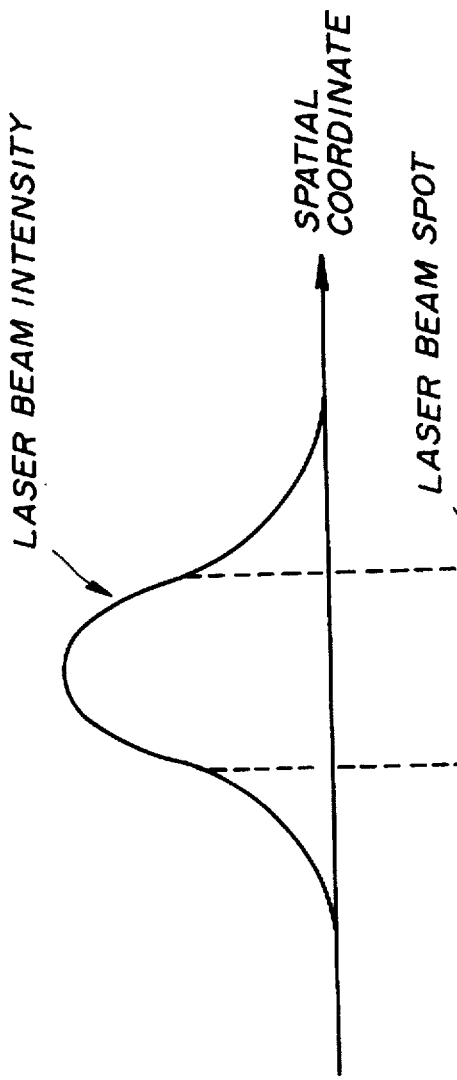
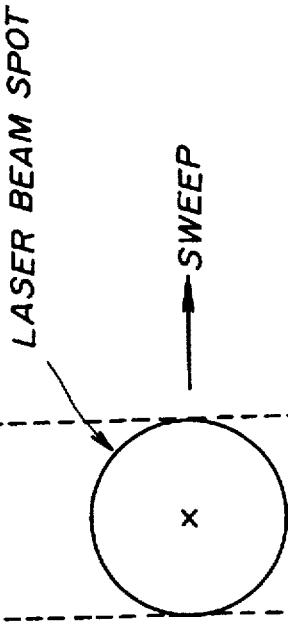
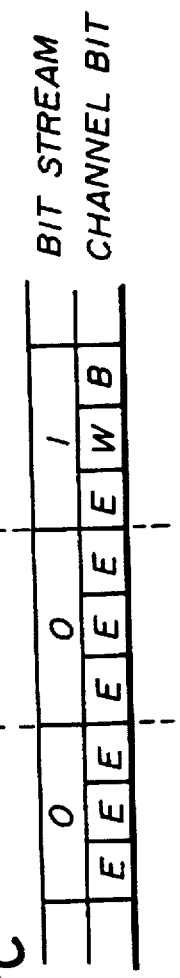
FIG.2A
FIG.2B
FIG.2C

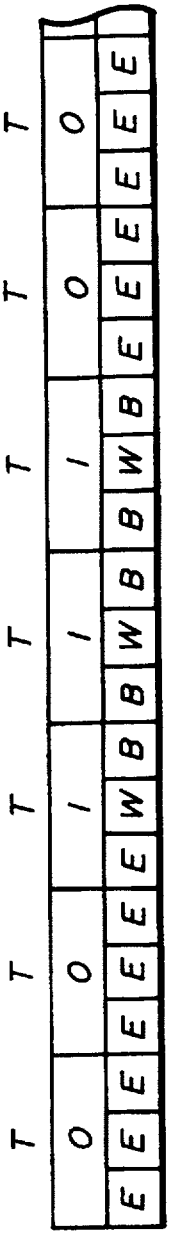
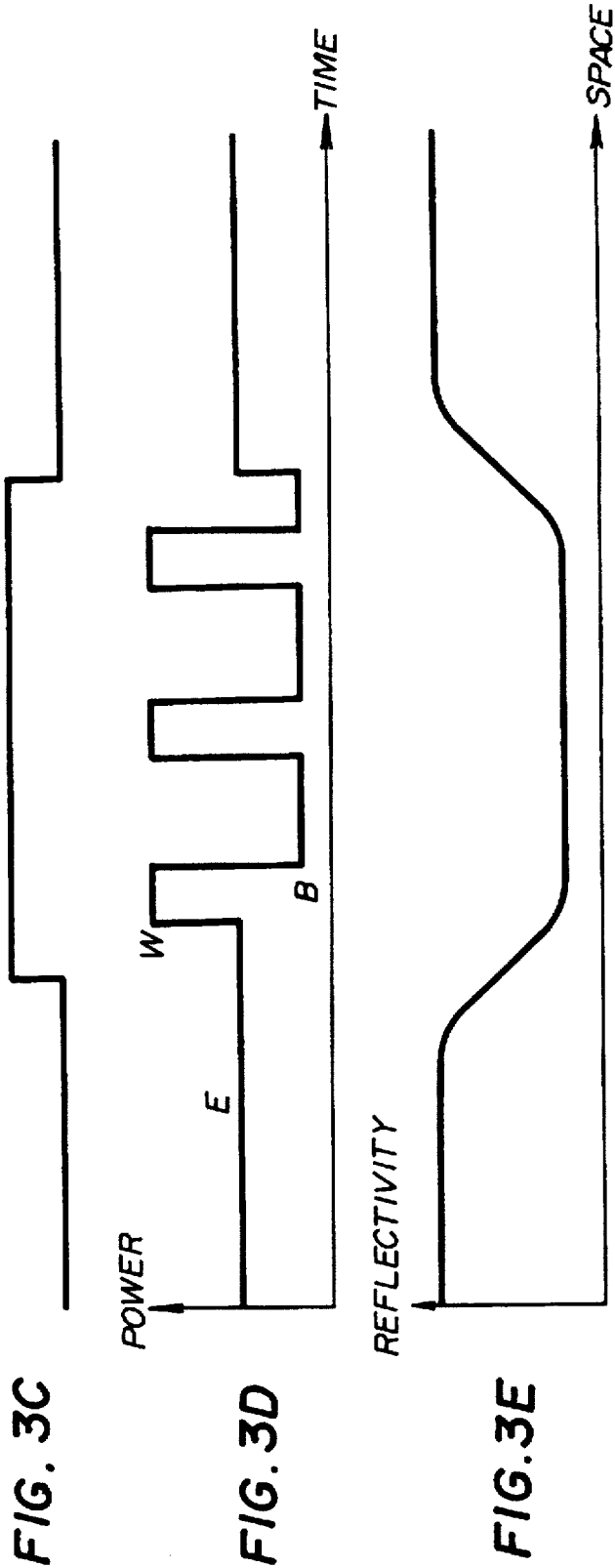
FIG. 3A
FIG. 3B
FIG. 3C
FIG. 3D
FIG. 3E

INPUT SIGNAL FOR B-LEVEL GATE

INPUT SIGNAL FOR E-LEVEL GATE

INPUT SIGNAL FOR W-LEVEL GATE

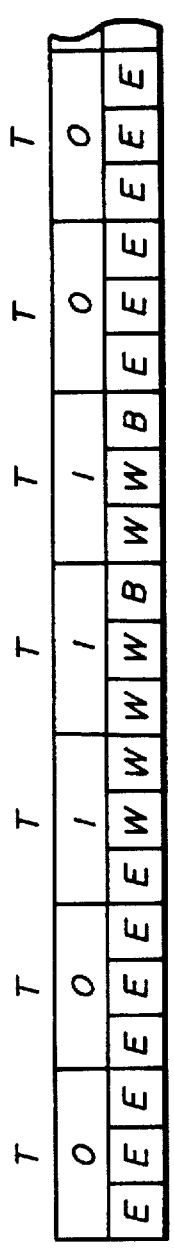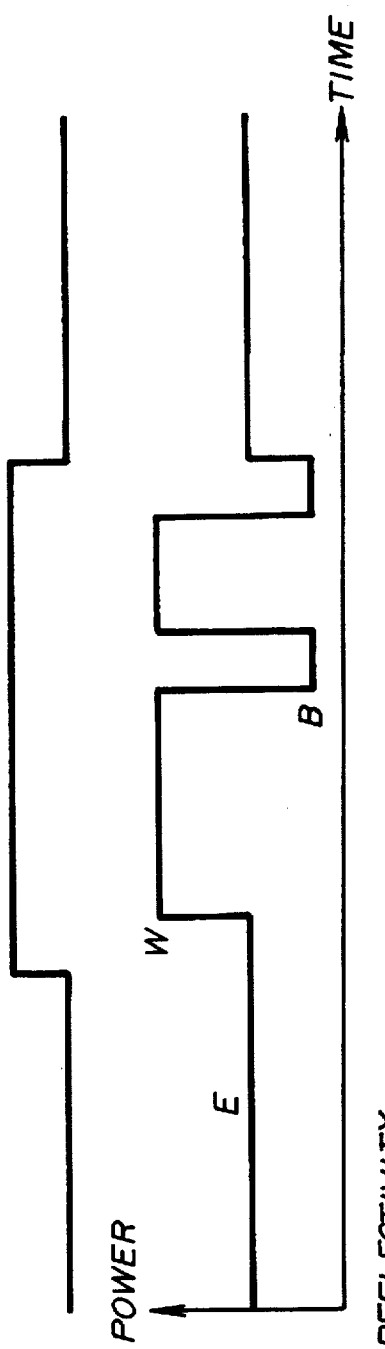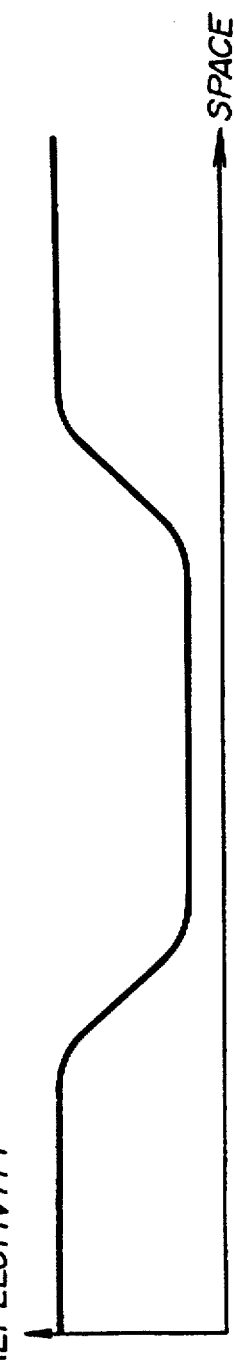
FIG.5A
FIG.5B
FIG.5C
FIG.5D
FIG.5E

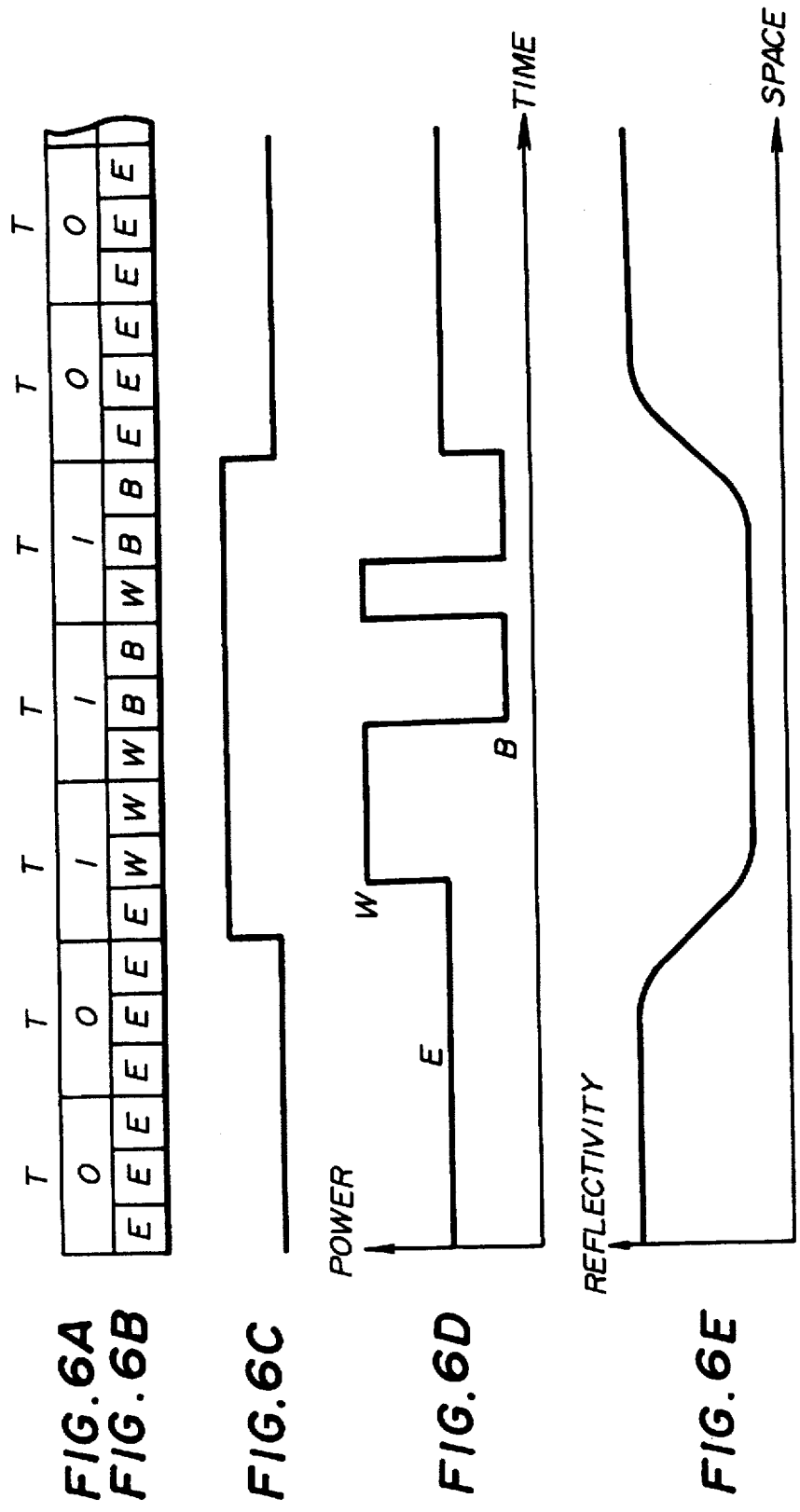

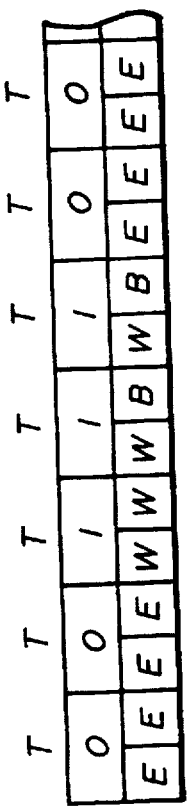
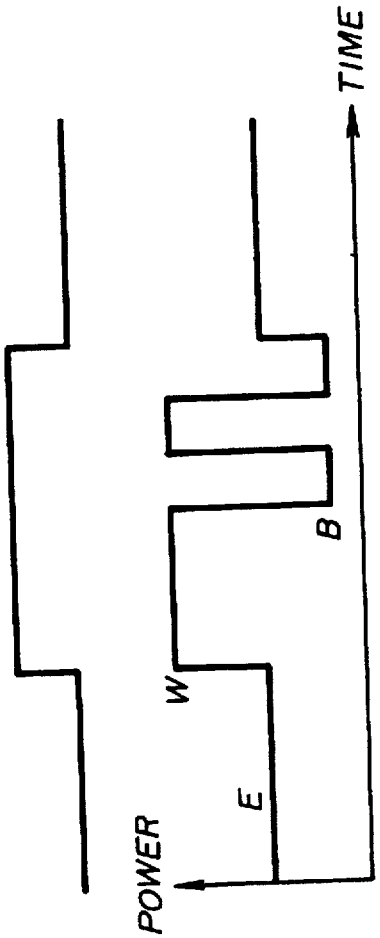
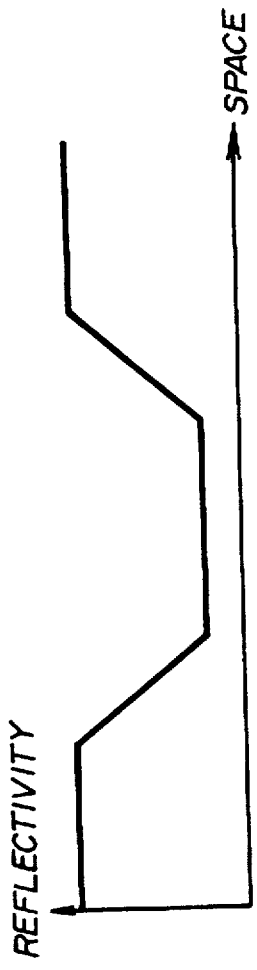
FIG. 7A
FIG. 7B
FIG. 7C
FIG. 7D
FIG. 7E

FIG. 9

| PRECEDING BIT | BIT | LINEAR VELOCITY (m/s) | | | |
|---|---|---|---|---|---|
| | | 1.4 m/s | 2.1 m/s | 2.8 m/s | 4.2 m/s |
| 0.1 | 0 | E E E E | E E E E | E E E E | E E E E |
| 0 | 1 | E E W B | E E E W B | E E W W | E E W W |
| 1 | 1 | W B B B | W B B B | W W B B | W W B B |
| LEVEL E (mW) | | 6.5 | 7.5 | 6.5 | 7.0 |
| LEVEL W (mW) | | 13.0 | 14.5 | 13.0 | 14.0 |
| LEVEL B (mW) | | 0.5 | 0.5 | 0.5 | 0.5 |

FIG. 10

| PRECEDING BIT | BIT | DISK TYPE | | | | | | | | | |
|---|---|---|---|---|---|---|---|---|---|---|---|
| | | 1 | | | 2 | | | 3 | 4 | 5 | 6 |
| | | LINEAR VELOCITY (m/s) | | | | | | | | | |
| | | 2 | 3 | 4 | 2 | 3 | 4 | 2 | 2 | 2 | 2 |
| 0 | 0 | EEEE | EEEE | EEEE | EEEE | EEEE | EEEE | EEEE | EEEE | EEEE | EEEE |
| 0 | 1 | EEWW | EWWW | EEWW | EEWW | EEWW | EEWW | EEWW | EEWW | EEWB | EEEW |
| 1 | 1 | BWWB | WWBB | WWBB | BWBB | WWBB | BWWB | WWBB | BWWB | BWBB | WBBB |
| LEVEL E (mW) | | 6.0 | 7.0 | 7.5 | 7.0 | 7.0 | 6.5 | 7.0 | 6.5 | 7.0 | 7.0 |
| LEVEL W (mW) | | 12.0 | 14.0 | 15.0 | 15.0 | 14.0 | 12.0 | 15.0 | 12.0 | 15.0 | 15.0 |
| LEVEL B (mW) | | 1.2 | 1.2 | 1.2 | 1.2 | 0.0 | 1.2 | 1.2 | 1.2 | 1.2 | 1.2 |

FIG. 11

| PRECEDING BIT | BIT | Disk Type 1 | | | Disk Type 2 | Disk Type 3 | | | Disk Type 4 | Disk Type 5 | Disk Type 6 |
|---|---|---|---|---|---|---|---|---|---|---|---|
| | | Linear Velocity (m/s) | | | | | | | | | |
| | | 2 | 3 | 4 | 2 | 2 | 3 | 4 | 2 | 2 | 2 |
| 0 | 0 | EE | EE | EE | EE | EE | EE | EE | EE | EE | EE |
| 0 | 1 | EW | EW | WW | EW | EW | WW | WW | EW | EW | EW |
| 1 | 1 | WB | WB | WB | WB | WB | WB | WB | WB | WB | WB |
| LEVEL E (mW) | | 6.0 | 7.0 | 7.5 | 7.0 | 6.5 | 6.5 | 7.0 | 7.0 | 7.0 | 7.0 |
| LEVEL W (mW) | | 12.0 | 14.0 | 15.0 | 14.0 | 13.0 | 12.0 | 15.0 | 15.0 | 15.0 | 15.0 |
| LEVEL B (mW) | | 0.0 | 1.2 | 2.0 | 1.2 | 0.0 | 0.0 | 1.2 | 0.0 | 1.2 | 0.0 |

# INFORMATION RECORDING METHOD AND DEVICE

This is a continuation of application Ser. No. 08/528,081 filed Sep. 14, 1995 now abandoned.

BACKGROUND OF THE INVENTION

1. Field of the Invention

The present invention generally relates to devices for and methods of recording information, and particularly relates to a device for and a method of recording sequential information on Phase Change recording media by using modulated laser light.

2. Description of the Prior Art

Phase Change recording media is a new type of media used for recording information. On the Phase Change recording media which is initially in an amorphous state, information is recorded by changing the media into a crystalline state. When high-energy laser light is focused upon a surface of the media, a point illuminated on by the laser light changes into the crystalline state. Reading information from the media employs low-intensity laser light, which is reflected by a point where the media is in the crystalline state, and is absorbed or scattered a point where the media is in the amorphous state. In order to erase information, higher-energy laser light is applied to melt the media back into the amorphous state.

Information recording devices employing such Phase Change recording media are disclosed, for example, in Japanese Laid-Open Patent Applications No. 1-184631 (referred to as a first reference), No.2-31329 (a second reference), and No.63-113938 (a third reference).

An information recording device disclosed in the first reference initializes Phase Change recording media with a first shot of a high-energy beam, and enhances reliability of recorded information with a second shot of an energy beam modulated between a high-power level and an intermediate power level. An information recording device disclosed in the second reference modulates the power of a light beam into a plurality of different levels so as to bring about a plurality of Phase Change levels in the media. In this device, thus, information is recorded in multi-levels.

In these devices, however, an overwriting technique of erasing recorded information and simultaneously recording new information with one shot of a beam is not disclosed. An information recording device implementing such an overwriting technique is disclosed, for example, in Japanese Patent No.63-848.

An information recording device disclosed in the third reference is also concerned with an overwriting technique. This device modulates laser light into a recording power level and an erasing power level, and, also, uses a lower power level which is illuminated for a short duration immediately after the illumination of the recording power level. While doing so, the device erases recorded information and simultaneously records new information. Information recording media used in this technique is not a Phase Change type. However, the Phase Change recording media seems to be applicable to the technique described in this reference.

There are two different methods of recording information on the media; one is a PPM (pulse-position modulation) method and the other is a PWM (pulse-width modulation) method. In the PPM method, information is recorded as positions of spot marks formed on the media. On the other hand, in the PWM method, information is recorded as changes in mark lengths along a longitudinal direction of tracks. The technique of the third reference is concerned with PPM method.

When information is recorded on the Phase Change recording media through the PWM method by changing lengths of marks, longer marks tend to have a broader width toward a tail thereof, which affects a reproducing performance. Thus, if the technique of the third reference is applied to the PWM method, broadened tails of long marks leads to a lower performance of reproducing information.

In order to obviate this problem observed in the PWM method, the applicant of the present invention discloses a method of optical information recording in Japanese Patent Application No.5-201758, which is cited here as a related-art technique. In this method, a bias power of electromagnetic-field pulses during the forming of marks on the media is made different from a bias power used for erasing information or a bias power used during mark intervals. By doing so, a width of a long mark can be made equal from the head to the tail, thus avoiding a lower performance of reproducing information.

However, when lengths of the marks are relatively long, these lengths tend to deviate from desired lengths. This is called "jitter", and affects the performance of reproducing information.

Also, the information recording devices of the prior art cannot cope with variations in recording characteristics of the Phase Change recording media. When the recording characteristics of the media are changed, optical recording conditions will also be changed. The information recording devices of the prior art fail to meet such a need. Also, it is required to obviate a problem that a laser source used for recording information can destroy itself by generating too much output.

Accordingly, there is a need in the field of the Phase Change technology for a device and a method of recording information which can avoid jitters of long marks formed on the media.

Also, there is a need for a device and a method of recording information which can cope with variations in recording characteristics of the Phase Change recording media.

SUMMARY OF THE INVENTION

Accordingly, it is a general object of the present invention to provide a device and a method of recording information which can satisfy the needs described above.

It is another and more specific object of the present invention to provide a device and a method of recording information which can avoid jitters of long marks formed on the media.

In order to achieve the above objects according to the present invention, a method of recording a bit stream on a Phase Change media by illuminating a laser beam on the Phase Change media includes assigning a predetermined number of channel bits to each bit of the bit stream, and assigning one of a highest power level, an intermediate power level, and a lowest power level of the laser beam to each of the channel bits so as to modulate the laser beam, wherein an arrangement of the highest power level, the intermediate power level, and the lowest power level for one bit of the bit stream depends on values of the one bit and an immediately preceding bit.

In the method described above, the arrangement of the power levels for a given bit is changed according to values of the given bit and the immediately preceding bit. Thus, the arrangement of the power levels can be tailored for a bit position where the given bit is 1 and the preceding bit is 0. That is, a position of a mark on the media can be adjusted by using an appropriate arrangement of the power levels. Thus, jitters of marks can be avoided.

It is yet another object of the present invention to provide a device and a method of recording information which can cope with variations in recording characteristics of the Phase Change recording media.

In order to achieve the above objects according to the present invention, a method of recording a bit stream on a Phase Change media by illuminating a laser beam on the Phase Change media includes assigning a predetermined number of channel bits to each bit of the bit stream, storing a plurality of arrangements of a highest power level, an intermediate power level, and a lowest power level of the laser beam assigned to the predetermined number of the channel bits, wherein the arrangements depend on values of a given one bit of the bit stream and an immediately preceding bit, first characteristics of the Phase Change media, second characteristics of the laser beam, and conditions for recording the bit stream, and selecting one of the arrangements for the given bit based on the values, the first characteristics, the second characteristics, and the conditions so as to modulate the laser beam.

In the method described above, the arrangements of the power levels are changeable in order to achieve optimal recording. By changing the arrangements of the power levels, a mark having a desired length and a desired width is formed for given recording characteristics of the Phase Change recording media.

Other objects and further features of the present invention will be apparent from the following detailed description when read in conjunction with the accompanying drawings.

BRIEF DESCRIPTION OF THE DRAWINGS

FIG. 1 is a block diagram of an information recording device according to a first embodiment of the present invention;

FIGS. 2A through 2E are illustrative drawings for explaining a mechanism of recording information by using a laser light beam;

FIGS. 3A through 3E are illustrative drawings for explaining a scheme for recording a bit stream in an optical disk memory of FIG. 1;

FIGS. 5A through 5E are illustrative drawings for explaining a scheme for recording a bit stream in the optical disk memory according to a second embodiment of the present invention;

FIGS. 6A through 6E are illustrative drawings for explaining a scheme for recording a bit stream in the optical disk memory according to a third embodiment of the present invention;

FIGS. 7A through 7E are illustrative drawings for explaining a scheme for recording a bit stream in the optical disk memory according to a fourth embodiment of the present invention;

FIG. 9 is a table chart showing a table according to a sixth embodiment of the present invention, which table determines various conditions to be used for a particular type of the optical disk memory with regard to a variety of linear velocities;

FIG. 10 is a table chart showing a table according to a variation of the sixth embodiment, which table determines various conditions to be used for various types of the optical disk memory with regard to a variety of linear velocities; and FIG. 11 is a table chart showing a table according to a another variation of the sixth embodiment, which table determines various conditions to be used for various types of the optical disk memory with regard to a variety of linear velocities.

DESCRIPTION OF THE PREFERRED EMBODIMENTS

Figure 2D:
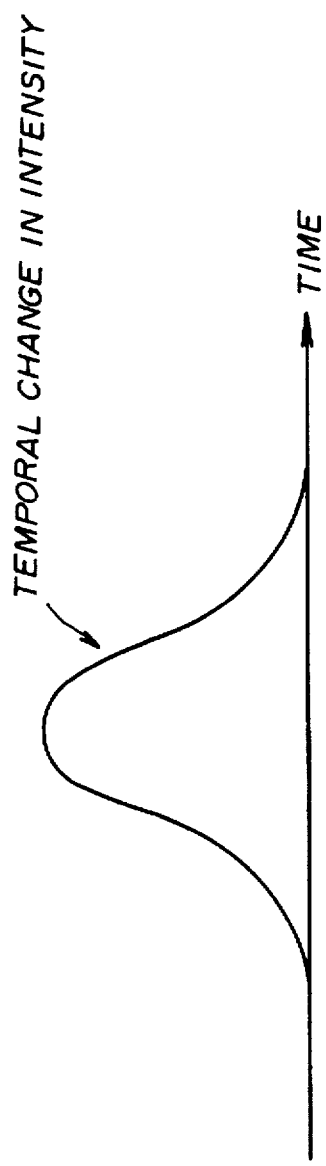

In the following, embodiments of the present invention will be described with reference to the accompanying drawings.

FIG. 1 shows an information recording device 1 according to a first embodiment of the present invention. The information recording device 1 includes an information processing unit 2, an input device 3 such as a keyboard, and a disk unit 4. The disk unit 4 includes a disk driving unit 5, a laser driving circuit 6, a laser source 7, and an optical disk memory 8.

The input device 3 receives commands from a user. Upon these commands, the information processing unit 2 carries out processing of data accordingly. The information processing unit 2 controls the disk unit 4 so that data provided externally or generated inside the information processing unit 2 is stored in the disk unit 4. The disk driving unit 5 drives the optical disk memory 8 under the control of the information processing unit 2. The laser driving circuit 6 under the control of the information processing unit 2 drives the laser source 7, and modulates the power of laser light emitted from the laser source 7. The optical disk memory 8 is rotated under the control of the disk driving unit 5, so that the data provided from the information processing unit 2 is recorded on the optical disk memory 8 by the modulated laser light. The data recorded on the optical disk memory 8 is a bit stream consisting of 0s and 1s.

In the first embodiment, a set of three bits are assigned to each bit of the bit stream. Here, each of these three bits are called a channel bit. Each of channel bits has a duration one third as long as one bit of the bit stream. Thus, one set of the three channel bits has the same duration as that of one bit of the bit stream.

Then, the power of the laser light generated by the laser source 7 is modulated into three different levels, "W" (write), "E" (erase), and "B" (bias). Here, these three levels have a relation as W>E>B. The power of the laser light is set to one of the W, E, and B levels for each of the channel bits.

In the first embodiment, the rule for assigning one of the W, E, and B levels to each channel bit is as follows. When a given bit of the bit stream is 0, each of the channel bits is assigned to the E level. That is, the set of the three channel bits becomes "EEE". When a given bit of the bit stream is 1 and a bit immediately preceding the given bit is 0, the set of the three channel bits is set to "EWB". When a given bit of the bit stream is 1 and a bit immediately preceding the given bit is 1, the set of the three channel bits is set to "BWB".

The bit stream provided from the information processing unit 2 is used for modulating the laser light of the laser source 7 into the E, W, and B levels under the control of the laser driving circuit 6. The modulated laser light is focused on a surface of the optical disk memory 8 to record the bit stream.

FIGS. 2A through 2E shows illustrative drawings for explaining an erasing mechanism and a writing mechanism. FIG. 2A shows a spatial distribution of a laser beam intensity. As shown in FIG. 2A, the intensity of the laser beam has a bell-shape-like distribution curve. FIG. 2B shows a spot of a laser beam whose size is regarded as a half-width of the intensity distribution. The spot shown in FIG. 2B sweeps over the Phase Change media. (To be exact, a disk media rotates while a position of the spot is fixed, so that the spot can sweep along a track on the media.)

FIG. 2C shows an example of the bit stream and the channel bits. In FIG. 2B and 2C, the size of the beam spot corresponds to a time length of one bit of the bit stream, and, thus, corresponds to that of three channel bits. This means that a time length for the beam spot to move a distance equal to its size is equal to a time length of one bit of the bit stream. In other words, if the circumference of the beam spot was illustrated for each bit of the bit stream, the circumferences for consecutive bits would be connected together side by side without overlapping with each other.

Although the size of the beam spot corresponds to a time length T of one bit of the bit stream in FIG. 2A and FIG. 2B, the size of the beam spot may be from 1T to 6T. Preferably, the size of the beam spot should be between 2T and 4T. In FIG. 2A through 2E, the size of the beam spot is shown as T just for simplicity of explanation. In all embodiments of the present invention, the size of the beam spot is set to about 3T.

FIG. 2D shows a temporal change in the intensity of the laser spot to which a given point on the media is subjected, in a case that the bit stream is comprised of consecutive 0s. Since the power level of the laser beam is "EEE" for 0, the given point on the media experiences a temporal change in the power level as shown in FIG. 2D. As shown in FIG. 2D, the given point is gradually heated to a moderate temperature, and, then, cooled gradually. Thus, regardless of a previous state of the given point, the media of the given point is changed into the crystalline state. The crystalline state has a high reflectivity, and is assigned to 0.

Figure 2E:
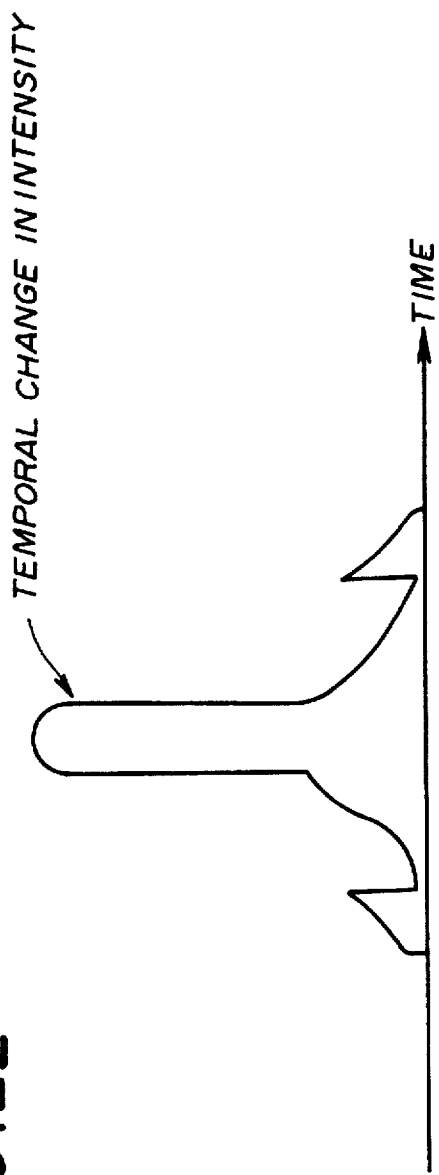

FIG. 2E shows a temporal change in the intensity of the laser spot to which a given point on the media is subjected in a case that the bit stream is comprised of consecutive 1s. Since the power level of the laser beam is "BWB" for 1, the given point on the media experiences a temporal change in the power level as shown in FIG. 2D. Here, the power level B is lower than the power level E, and the power level W is higher than the power level E. As shown in FIG.2E, the given point is rapidly heated to a high temperature, and, then, rapidly cooled down. Thus, regardless of a previous state of the given point, the media of the given point is changed into the amorphous state. The amorphous state has a low reflectivity, and is assigned to 1.

FIGS. 3A through 3E show illustrative drawings for explaining a scheme for recording the bit stream in the optical disk memory 8. FIG. 3A shows an example of the bit stream. FIG.3B shows the power level of the laser light assigned to each channel bit. FIG. 3C shows a profile of a mark which should be recorded on the optical disk memory 8. FIG. 3D shows a power of the laser light illuminated on the optical disk memory 8, and FIG. 3E shows a reflectivity profile of the optical disk memory 8 on which the bit stream is recorded.

As shown in FIG. 3A, time-sequence information consisting of a number of binary bits with a bit time T is supplied. As shown in FIG. 3B, three channel bits with a bit time T/3 are assigned to each bit of the time-sequence information (bit stream). Here, if a given bit of the bit stream is 0, the three corresponding channel bits are "EEE". If a given bit of the bit stream is 1 and an immediately preceding bit is 0, the three corresponding channel bits are "EWB". If a given bit of the bit stream is 1 and an immediately preceding bit is 1, the three corresponding channel bits are "BWB".

When a given bit of the bit stream is 0, the laser light is illuminated on the optical disk memory 8 with the power level "EEE" as shown in FIG. 3D. Thus, a corresponding point on the optical disk memory 8 is gradually heated to a moderate temperature, and, then, gradually cooled. This point on the optical disk memory 8 is crystallized to show high reflectivity as shown in FIG. 3E.

When a given bit of the bit stream is 1 and follows a bit of 0, the laser light is illuminated on the optical disk memory 8 with the power level "EWB" as shown in FIG. 3D. Thus, a corresponding point on the optical disk memory 8 continues to be gradually heated to a moderate temperature by the E level which follows the E level of the preceding bit. Then, the corresponding point is rapidly heated to a high temperature by the W level, and, finally, rapidly cooled by the B level. This point on the optical disk memory 8 is made into the amorphous state to show low reflectivity as shown in FIG. 3E.

When a given bit of the bit stream is 1 and follows a bit of 1, the laser light is illuminated on the optical disk memory 8 with the power level "BWB" as shown in FIG. 3D. Thus, a corresponding point on the optical disk memory 8 continues to be cooled down by the first B level which follows the B level of the preceding bit. Then, the corresponding point is rapidly heated to a high temperature by the W level, and, finally, rapidly cooled down by the last B level. This point on the optical disk memory 8 is made into the amorphous state to show low reflectivity as shown in FIG. 3E.

In this manner, the optical disk memory 8 is Phase Changed into either the crystalline state having high reflectivity or the amorphous state having low reflectivity, depending on a value of the given bit of the bit stream. Thus, the mark as shown in FIG. 3E is recorded on the optical disk memory 8. This mark exhibits changes in reflectivity so that it can be read optically.

As described above, when a given bit is 1 and a preceding bit is 0, the first channel bit is assigned to the E level. This E level is used in order to avoid the jitters by adjusting a length of the mark. Also, the two B levels in "BWB" used when a given bit is 1 and a preceding bit is 1 serve not only to cool down the media, but also to prevent heat from building up in the media. Thus, a width of the mark can avoid broadening even if the mark becomes relatively long.

Accordingly, the mark created on the optical disk memory 8 can be made in a desired length, can avoid the broadening of the width, and, especially, can avoid the broadening of the width towards its tail. The mark having the desired length and the desired width results in a better performance of reproducing information.

Also, as described above, the optical disk memory 8 is crystallized for bit 0 through gradual heating to a moderate temperature and gradual cooling, and is turned into the amorphous state for bit 1 through rapid heating to a high temperature and rapid cooling. Thus, information can be overwritten in the optical disk memory 8 even if there is prerecorded information. Since there is no need for a stage for erasing information prior to writing, a better performance can be expected for writing information.

Figure 4A:
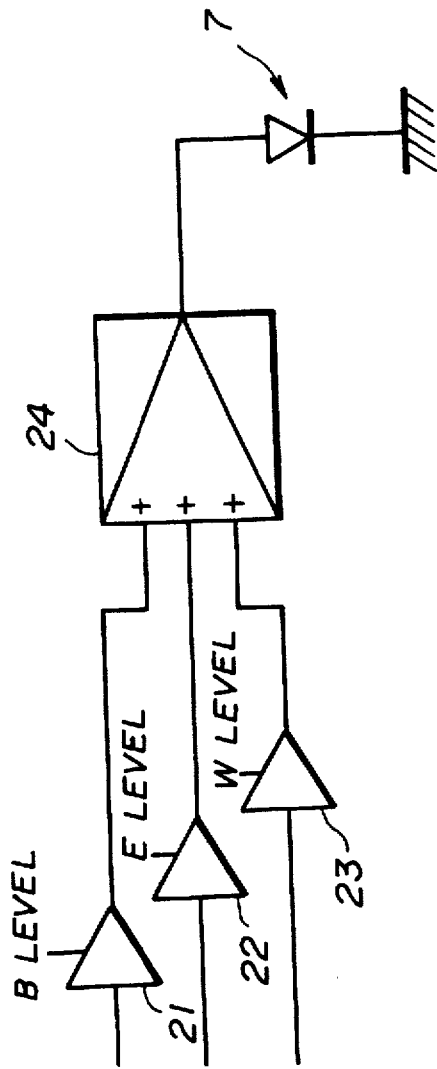
FIG. 4A is a circuit diagram of part of a laser driving circuit of FIG. 1.

FIGS. 4A though 4E show diagrams for explaining the control of the power level of the laser light. FIG. 4A shows a block diagram of part of the laser driving circuit 6 which drives the laser source 7. The part for driving the laser source 7 includes a B-level gate 21, an E-level gate 22, a W-level gate 23, and an electric-current driver 24.

Figure 4B:
FIGS. 4B through 4D are time charts showing input signals for gates of FIG. 4A.
Figure 4C:
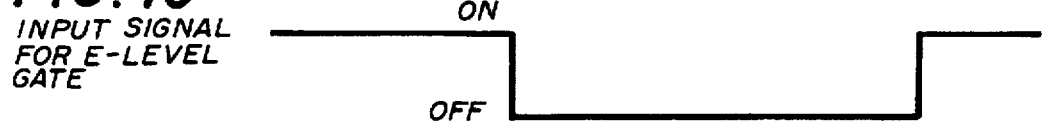
Figure 4D:
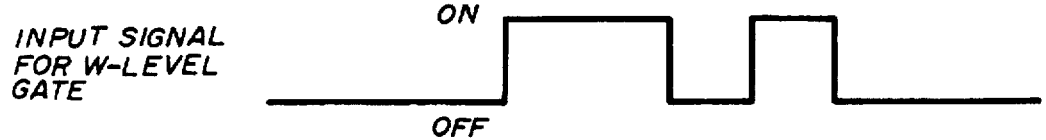
Figure 4E:
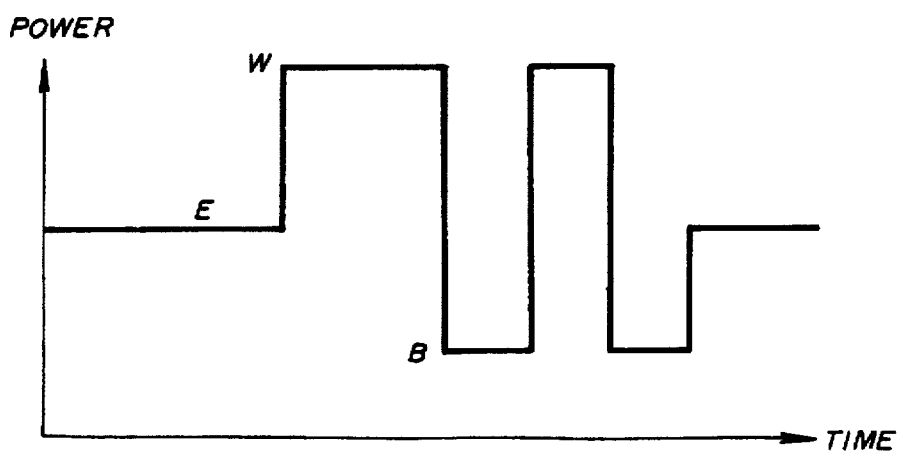
FIG. 4E is a time chart showing a power level of a laser beam emitted from a laser source of FIG.1 when the input signals of FIGS. 4B through 4D are applied to the circuit of FIG. 4A.

FIGS. 4B though 4D show examples of input signals applied to the B-level gate 21, the E-level gate 22, and the W-level gate 23, respectively. When one of these three signals is on, the other two are off as shown in FIGS. 4B though 4D. Each of the B-level gate 21, the E-level gate 22, and the W-level gate 23 outputs a signal of a corresponding level when a corresponding input signal is on. Output signals from these gates are applied to the electric-current driver 24. The electric-current driver 24 applies to the laser source (laser diode) 7 an electric current commensurate with the signal level which is provided from one of the three gates. When the input signals shown in FIGS. 4B through 4D are applied, the laser light emitted from the laser source 7 will have a power level as shown in FIG. 4E.

The conversion of the bit stream into channel bits can be also carried out by a simple logic circuit. A configuration of the logic circuit is well within the scope of ordinary skills in the art. Thus, a description of the configuration will be omitted.

Since the power level of the laser light can be controlled by a simple logic circuit, it is easy to change conditions regarding the power level of the laser light. These conditions include arrangements of the power levels such as "EEE", "EWB" and "BWB", an actual laser output for each of the E, W, and B power levels, etc. These conditions are modified according to characteristics of the Phase Change media used for the optical disk memory 8.

In the following, embodiments in which these conditions are changed will be described with reference to the accompanying drawings.

FIGS. 5A through 5E show a scheme for recording the bit stream according to a second embodiment of the present invention. The second embodiment is implemented on the information recording device 1 of FIG. 1, and differs from the first embodiment only in the arrangement of the power levels.

In the second embodiment, the rule for assigning one of the W, E, and B levels to each channel bit is as follows. When a given bit of the bit stream is 0, each of the channel bits is assigned to the E level. That is, the set of the three channel bits becomes "EEE". When a given bit of the bit stream is 1 and a bit immediately preceding the given bit is 0, the set of the three channel bits is set to "EWW". When a given bit of the bit stream is 1 and a bit immediately preceding the given bit is 1, the set of the three channel bits is set to "WWB".

As shown in FIG.5A, a bit stream consisting of a number of binary bits with a bit time T is supplied. As shown in FIG. 5B, three channel bits with a bit time T/3 are assigned to each bit of the bit stream.

When a given bit of the bit stream is 0, the laser light is illuminated on the optical disk memory 8 with the power level "EEE" as shown in FIG. 5D. Thus, a corresponding point on the optical disk memory 8 is gradually heated to a moderate temperature, and, then, gradually cooled. This point on the optical disk memory 8 is crystallized to show high reflectivity as shown in FIG.5E.

When a given bit of the bit stream is 1 and follows a bit of 0, the laser light is illuminated on the optical disk memory 8 with the power level "EWW" as shown in FIG. 5D. Thus, a corresponding point on the optical disk memory 8 continues to be gradually heated to a moderate temperature by the E level which follows the E level of the preceding bit. Then, the corresponding point is rapidly heated to a high temperature by the consecutive W levels. This point is eventually cooled down by either the E level or the B level. Thus, this point on the optical disk memory 8 is made into the amorphous state to show low reflectivity as shown in FIG. 5E.

When a given bit of the bit stream is 1 and follows a bit of 1, the laser light is illuminated on the optical disk memory 8 with the power level "WWB" as shown in FIG. 5D. Thus, a corresponding point on the optical disk memory 8 is rapidly heated to a high temperature by the consecutive W levels. Then, the corresponding point is rapidly cooled down by the B level. This point on the optical disk memory 8 is made into the amorphous state to show low reflectivity as shown in FIG. 5E.

In this manner, the optical disk memory 8 is Phase Changed into either the crystalline state having high reflectivity or the amorphous state having low reflectivity, depending on a value of the given bit of the bit stream. Thus, the mark as shown in FIG. 5E is recorded on the optical disk memory 8. This mark exhibits changes in reflectivity so that it can be read optically.

As described above, when a given bit is 1 and a preceding bit is 0, the first channel bit is assigned to the E level. This E level is used in order to avoid the jitters by adjusting a length of the mark. Also, the B level in "WWB" used when a given bit is 1 and a preceding bit is 1 serves not only to cool down the media, but also to prevent heat from building up in the media. Thus, a width of the mark can avoid broadening even if the mark becomes relatively long.

Accordingly, the mark created on the optical disk memory 8 can be made in a desired length, can avoid the broadening of the width, and, especially, can avoid the broadening of the width towards its tail. The mark having the desired length and the desired width results in a better performance of reproducing information.

Also, as described above, the optical disk memory 8 is crystallized for bit 0 through gradual heating to a moderate temperature and gradual cooling, and is turned into the amorphous state for bit 1 through rapid heating to a high temperature and rapid cooling. Thus, information can be overwritten in the optical disk memory 8 even if there is prerecorded information. Since there is no need for a stage for erasing information prior to writing, a better performance can be expected for writing information.

The second embodiment of the present invention is better suited for a type of the Phase Change recording media for which the first embodiment tends to create a mark head delayed from a desired point. That is, the second embodiment employs the power level "EWW" for a bit 1 following a bit 0, so that the mark head is better heated to a high temperature by the consecutive W levels, compared to when the power level "EWB" is employed in the first embodiment.

FIGS. 6A through 6E show a scheme for recording the bit stream according to a third embodiment of the present invention. The third embodiment is implemented on the information recording device 1 of FIG. 1, and differs from the first embodiment only in the arrangement of the power levels.

In the third embodiment, the rule for assigning one of the W, E, and B levels to each channel bit is as follows. When a given bit of the bit stream is 0, each of the channel bits is assigned to the E level. That is, the set of the three channel bits becomes "EEE". When a given bit of the bit stream is 1 and a bit immediately preceding the given bit is 0, the set of the three channel bits is set to "EWW". When a given bit of the bit stream is 1 and a bit immediately preceding the given bit is 1, the set of the three channel bits is set to "WBB".

As shown in FIG. 6A, a bit stream consisting of a number of binary bits with a bit time T is supplied. As shown in FIG. 6B, three channel bits with a bit time T/3 are assigned to each bit of the bit stream.

When a given bit of the bit stream is 0, the laser light is illuminated on the optical disk memory 8 with the power level "EEE" as shown in FIG. 6D. Thus, a corresponding point on the optical disk memory 8 is gradually heated to a moderate temperature, and, then, gradually cooled. This point on the optical disk memory 8 is crystallized to show high reflectivity as shown in FIG.6E.

When a given bit of the bit stream is 1 and follows a bit of 0, the laser light is illuminated on the optical disk memory 8 with the power level "EWW" as shown in FIG. 6D. Thus, a corresponding point on the optical disk memory 8 continues to be gradually heated to a moderate temperature by the E level which follows the E level of the preceding bit. Then, the corresponding point is rapidly heated to a high temperature by the consecutive W levels. This point is eventually cooled down by either the E level or the B level. Thus, this point on the optical disk memory 8 is made into the amorphous state to show low reflectivity as shown in FIG. 6E.

When a given bit of the bit stream is 1 and follows a bit of 1, the laser light is illuminated on the optical disk memory 8 with the power level "WBB" as shown in FIG. 6D. Thus, a corresponding point on the optical disk memory 8 is rapidly heated to a high temperature by the W level. Then, the corresponding point is rapidly cooled down by the consecutive B levels. This point on the optical disk memory 8 is made into the amorphous state to show low reflectivity as shown in FIG. 6E.

In this manner, the optical disk memory 8 is Phase Changed into either the crystalline state having high reflectivity or the amorphous state having low reflectivity, depending on a value of the given bit of the bit stream. Thus, the mark as shown in FIG. 6E is recorded on the optical disk memory 8. This mark exhibits changes in reflectivity so that it can be read optically.

As described above, when a given bit is 1 and a preceding bit is 0, the first channel bit is assigned to the E level. This E level is used in order to avoid the jitters by adjusting a length of the mark. Also, the B level in "WBB" used when a given bit is 1 and a preceding bit is 1 serves not only to cool down the media, but also to prevent heat from building up in the media. Thus, a width of the mark can avoid broadening even if the mark becomes relatively long.

Accordingly, the mark created on the optical disk memory 8 can be made in a desired length, can avoid the broadening of the width, and, especially, can avoid the broadening of the width towards its tail. The mark having the desired length and the desired width results in a better performance of reproducing information.

Also, as described above, the optical disk memory 8 is crystallized for bit 0 through gradual heating to a moderate temperature and gradual cooling, and is turned into the amorphous state for bit 1 through rapid heating to a high temperature and rapid cooling. Thus, information can be overwritten in the optical disk memory 8 even if there is prerecorded information. Since there is no need for a stage for erasing information prior to writing, a better performance can be expected for writing information.

The third embodiment of the present invention is better suited for a type of the Phase Change media for which the second embodiment tends to create a mark with a broadened tail. That is, the third embodiment employs the power level "WBB" for consecutive bit is, so that heat does not build up in the Phase Change media as much as when the power level "WWB" is employed in the second embodiment. Specifically, the third embodiment is suited for cases in which a linear velocity of the Phase Change media is relatively low, since a low linear velocity leads to the building up of heat.

FIGS. 7A through 7E show a scheme for recording the bit stream according to a fourth embodiment of the present invention. The fourth embodiment is implemented on the information recording device 1 of FIG. 1, and differs from the first embodiment only in the arrangement of the power levels.

In the fourth embodiment, a set of two channel bits is assigned to each bit of the bit stream. The rule for assigning one of the W, E, and B levels to each channel bit is as follows. When a given bit of the bit stream is 0, each of the channel bits is assigned to the E level. That is, the set of the two channel bits becomes "EE". When a given bit of the bit stream is 1 and a bit immediately preceding the given bit is 0, the set of the two channel bits is set to "WW". When a given bit of the bit stream is 1 and a bit immediately preceding the given bit is 1, the set of the two channel bits is set to "WB".

As shown in FIG. 7A, a bit stream consisting of a number of binary bits with a bit time T is supplied. As shown in FIG. 7B, two channel bits with a bit time T/2 are assigned to each bit of the bit stream.

When a given bit of the bit stream is 0, the laser light is illuminated on the optical disk memory 8 with the power level "EE" as shown in FIG. 7D. Thus, a corresponding point on the optical disk memory 8 is gradually heated to a moderate temperature, and, then, gradually cooled. This point on the optical disk memory 8 is crystallized to show high reflectivity as shown in FIG. 7E.

When a given bit of the bit stream is 1 and follows a bit of 0, the laser light is illuminated on the optical disk memory 8 with the power level "WW" as shown in FIG. 7D. Thus, a corresponding point on the optical disk memory 8 is rapidly heated to a high temperature by the consecutive W levels. This point is eventually cooled down by either the E level or the B level. Thus, this point on the optical disk memory 8 is made into the amorphous state to show low reflectivity as shown in FIG. 7E.

When a given bit of the bit stream is 1 and follows a bit of 1, the laser light is illuminated on the optical disk memory 8 with the power level "WB" as shown in FIG. 7D. Thus, a corresponding point on the optical disk memory 8 is rapidly heated to a high temperature by the W level. Then, the corresponding point is rapidly cooled down by the B level. This point on the optical disk memory 8 is made into the amorphous state to show low reflectivity as shown in FIG. 7E.

In this manner, the optical disk memory 8 is Phase Changed into either the crystalline state having high reflectivity or the amorphous state having low reflectivity, depending on a value of the given bit of the bit stream. Thus, the mark as shown in FIG. 7E is recorded on the optical disk memory 8. This mark exhibits changes in reflectivity so that it can be read optically.

In the fourth embodiment, the B level in "WB" used when a given bit is 1 and a preceding bit is 1 serves not only to cool down the media, but also to prevent heat from building up in the media. Thus, a width of the mark can avoid broadening even if the mark becomes relatively long.

Accordingly, the mark created on the optical disk memory 8 can be made in a desired length, can avoid the broadening of the width, and, especially, can avoid the broadening of the width towards its tail. The mark having the desired length and the desired width results in a better performance of reproducing information.

Also, as described above, the optical disk memory 8 is crystallized for bit 0 through gradual heating to a moderate temperature and gradual cooling, and is turned into the amorphous state for bit 1 through rapid heating to a high temperature and rapid cooling. Thus, information can be overwritten in the optical disk memory 8 even if there is prerecorded information. Since there is no need for a stage for erasing information prior to writing, a better performance can be expected for writing information.

In the fourth embodiment of the present invention, the number of channel bits only amounts to twice as many as that of the bits of the bit stream, so that a substantially high frequency for a clock signal is not necessary. Thus, the fourth embodiment is practically sound in this respect, compared to the first to third embodiments.

FIGS. 8A through 8E show a scheme for recording the bit stream according to a fifth embodiment of the present invention. The fifth embodiment is implemented on the information recording device 1 of FIG. 1, and differs from the first embodiment only in the arrangement of the power levels.

In the fifth embodiment, a set of two channel bits is assigned to each bit of the bit stream. The rule for assigning one of the W, E, and B levels to each channel bit is as follows. When a given bit of the bit stream is 0, each of the channel bits is assigned to the E level. That is, the set of the two channel bits becomes "EE". When a given bit of the bit stream is 1 and a bit immediately preceding the given bit is 0, the set of the two channel bits is set to "EW". When a given bit of the bit stream is 1 and a bit immediately preceding the given bit is 1, the set of the two channel bits is set to "WB".

Figures 8A, 8B, 8C, 8D, 8E:
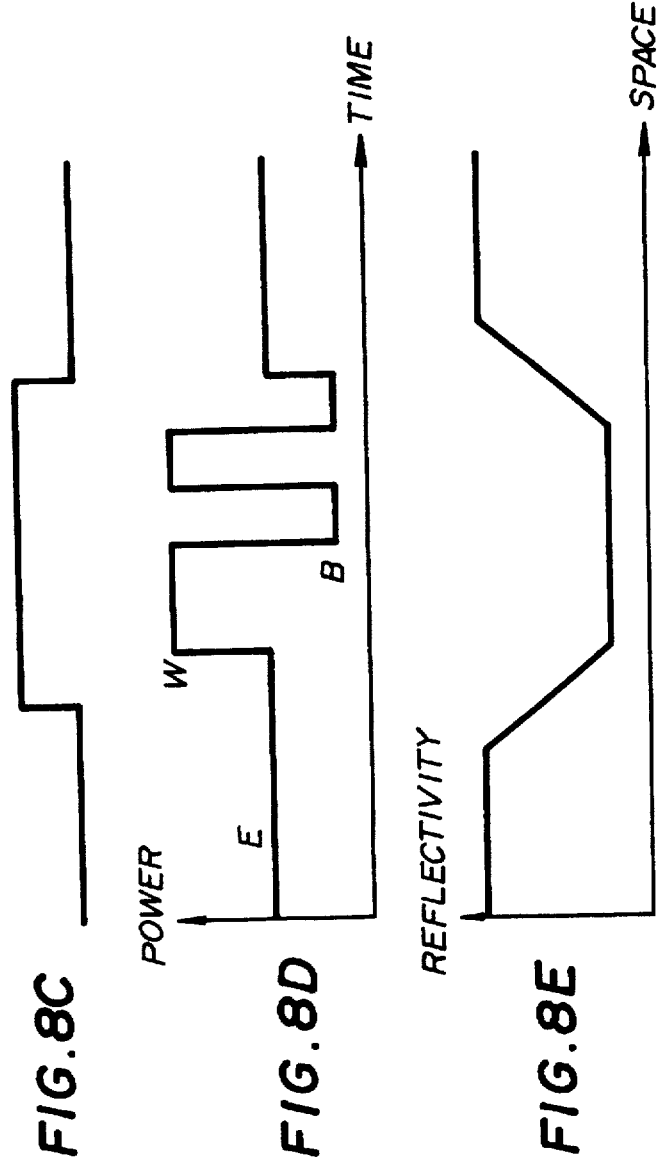
FIGS. 8A through 8E are illustrative drawings for explaining a scheme for recording a bit stream in the optical disk memory according to a fifth embodiment of the present invention.

As shown in FIG. 8A, a bit stream consisting of a number of binary bits with a bit time T is supplied. As shown in FIG. 8B, two channel bits with a bit time T/2 are assigned to each bit of the bit stream.

When a given bit of the bit stream is 0, the laser light is illuminated on the optical disk memory 8 with the power level "EE" as shown in FIG. 8D. Thus, a corresponding point on the optical disk memory 8 is gradually heated to a moderate temperature, and, then, gradually cooled. This point on the optical disk memory 8 is crystallized to show high reflectivity as shown in FIG. 8E.

When a given bit of the bit stream is 1 and follows a bit of 0, the laser light is illuminated on the optical disk memory 8 with the power level "EW" as shown in FIG. 8D. Thus, a corresponding point on the optical disk memory 8 continues to be gradually heated to a moderate temperature by the E level which follows the E level of the previous bit. Then, this point is rapidly heated to a high temperature by the W level. This point is eventually cooled down by either the E level or the B level. Thus, this point on the optical disk memory 8 is made into the amorphous state to show low reflectivity as shown in FIG. 8E.

When a given bit of the bit stream is 1 and follows a bit of 1, the laser light is illuminated on the optical disk memory 8 with the power level "WB" as shown in FIG. 8D. Thus, a corresponding point on the optical disk memory 8 is rapidly heated to a high temperature by the W level. Then, the corresponding point is rapidly cooled down by the B level. This point on the optical disk memory 8 is made into the amorphous state to show low reflectivity as shown in FIG. 8E.

In this manner, the optical disk memory 8 is Phase Changed into either the crystalline state having high reflectivity or the amorphous state having low reflectivity, depending on a value of the given bit of the bit stream. Thus, the mark as shown in FIG. 8E is recorded on the optical disk memory 8. This mark exhibits changes in reflectivity so that it can be read optically.

As described above, when a given bit is 1 and a preceding bit is 0, the first channel bit is assigned to the E level. This E level is used in order to avoid the jitters by adjusting a length of the mark. Also, the B level in "WB" used when a given bit is 1 and a preceding bit is 1 serves not only to cool down the media, but also to prevent heat from building up in the media. Thus, a width of the mark can avoid broadening even if the mark becomes relatively long.

Accordingly, the mark created on the optical disk memory 8 can be made in a desired length, can avoid the broadening of the width, and, especially, can avoid the broadening of the width towards its tail. The mark having the desired length and the desired width results in a better performance of reproducing information.

Also, as described above, the optical disk memory 8 is crystallized for bit 0 through gradual heating to a moderate temperature and gradual cooling, and is turned into the amorphous state for bit 1 through rapid heating to a high temperature and rapid cooling. Thus, information can be overwritten in the optical disk memory 8 even if there is prerecorded information. Since there is no need for a stage for erasing information prior to writing, a better performance can be expected for writing information.

In the fifth embodiment of the present invention, the number of channel bits only amounts to twice as many as that of the bits of the bit stream, so that a substantially high frequency for a clock signal is not necessary. Thus, the fifth embodiment is practically sound in this respect, compared to the first through third embodiments of the present invention. Also, the fifth embodiment adjusts a starting point of the mark so as to avoid the jitters. Thus, the fifth embodiment may have better performance of reproducing information than does the fourth embodiment, depending on the characteristics of the Phase Change recording media used for the optical disk memory 8.

A sixth embodiment of the present invention will be described below. In the sixth embodiment, the information recording device 1 of FIG. 1 is equipped with a function to change arrangements of the power levels and the actual output level of the laser light. These conditions can be changed according to a type of the optical disk memory 8 and/or a linear velocity of the optical disk memory 8. Changes in the conditions may be made through the input device 3 by a user, or may be made automatically by reading control information prerecorded on the optical disk memory 8.

FIG. 9 shows a table which determines the conditions to be used for a particular type of the optical disk memory 8 with regard to a variety of linear velocities. This table may be stored in the information processing unit 2 or in the laser driving circuit 6.

The optical disk memory 8 used in the sixth embodiment has a disk base which is 1.2-mm thick and made of a polycarbonate resin. On the disk base are formed a first heat-resistant protective layer made of $ZnS.SiO_2$ with a 190-nm thickness, a recording layer made of Ag—In—Sb—Te with a 18-nm thickness, a second heat-resistant protective layer made of $ZnS.SiO_2$ with a 25-nm thickness, a heat-releasing reflective layer made of an Al alloy with a 150-nm thickness, and a photopolymer layer cured by ultraviolet light. These layers form a Phase Change recording media.

A laser spot on the optical disk memory 8 has a 0.90-μm diameter and a 780-nm wavelength. Also, the bit time T is reciprocal to the linear velocity such that one bit of the bit stream corresponds to 0.324 μm on the optical disk memory 8. It should be noted that the diameter of the laser beam is about three times as large as the corresponding spatial extent of one bit.

The arrangements of the power levels and the output levels of the laser light shown in FIG. 9 are optimal with regard to each linear velocity. When the linear velocity is slower, a cooling period (period of the B levels) should be longer lest the recording media lacks a sufficient cooling time.

When the linear velocity is faster, the output level of the laser beam for recording should be generally higher lest the beam lacks sufficient power to record. In FIG. 9, however, entries in the table do not appear to correspond. This is because the need for the higher output level is to some extent compensated for by an elongated W period in the arrangement of the power levels.

In this manner, the bit stream is optimally recorded on the optical disk memory 8 by changing conditions according to the linear velocity. In other words, recording conditions are optimal regardless of the linear velocity. Thus, the sixth embodiment of the present invention is versatile in this regard.

Adapted to the linear velocity, the arrangements of the power levels and the output levels of the laser light are adjusted in the sixth embodiment. However, the present invention is not limited to adapting to only to the linear velocity. For example, the arrangements and the output levels may be changed according to a type of the optical disk memory 8 as well. An example of a table for such a case is shown in FIG. 10 as a variation of the sixth embodiment.

In FIG. 10, the arrangements of the power levels and the output levels of the laser light are adjusted in order to achieve optimal recording for each type of the optical disk memory 8 with regard to each linear velocity.

FIG. 11 shows another variation of the sixth embodiment. In this variation, two channel bits are assigned to one bit of the bit stream. In FIG. 11, the arrangement of the power level and the output level of the laser light are changed according to the linear velocity and the type of the optical disk memory 8. When there are only two channel bits, the arrangement of the power level may be changed only for a bit 1 following a bit 0. As noted before, using only two channel bits is practically sound.

There is no need to mention that only the arrangements of the power levels may be changed according to, for example, the type of the disk memory 8, or that only the output levels of the laser light may be changed according to, for example, the linear velocity. There are various variations with regard to which conditions are changed according to which factors. Such factors include a diameter of the laser beam, a wavelength, a corresponding spatial size of one bit relative to the diameter of the laser beam, etc. These variations are within the scope of the present invention.

According to the sixth embodiment and variations thereof, the arrangements of the power levels and the output levels of the laser light are changeable in order to achieve optimal recording. These conditions are changed according to various factors such as the linear velocity, the type of the optical disk memory, etc. By changing the arrangements and the output levels, a mark having a desired length and a desired width is formed regardless of these factors. Specifically, the jitters and the broadening of the width are prevented to enhance a performance of reproducing information.

In the present invention, the arrangement of the power levels of the laser light for a given bit is determined by a value of the given bit and a value of the preceding bit. Thus, a power level assigned to each channel bit can be determined through a simple logic formula. Since the optimal recording of the bit stream can be provided by simple digital processing, a high precision is achieved and a change in the setting of the arrangements is easy. Also, a plurality of the arrangements of the power levels and a plurality of sets of laser output levels can be prepared in advance so as to readily cope with changes in various recording factors.

Further, the present invention is not limited to these embodiments, but various variations and modifications may be made without departing from the scope of the present invention.

What is claimed is:

1. A method of recording a bit stream on a Phase Change media using a PWM method by illuminating a laser beam on said Phase Change media to overwrite previous records directly with said bit stream, said method comprising the steps of:

a) assigning a predetermined number of channel bits to each bit of said bit stream; and b) assigning one of a highest power level, an intermediate power level, and a lowest power level of said laser beam to each of said channel bits so as to modulate said laser beam, wherein an arrangement of said highest power level, said intermediate power level, and said lowest power level for one bit of said bit stream depends on values of said one bit and an immediately preceding bit, said arrangement controlling at least a falling speed of temperature of said Phase Change media so that said Phase Change media is made into one of a crystalline state or an amorphous state to form a mark having a desired length and width.

2. The method as claimed in claim 1, wherein a time length of said each bit of said bit stream is as long as that of each of said channel bits times said predetermined number of said channel bits.

3. The method as claimed in claim 1, wherein said step b) comprises:

b1) assigning said intermediate power level to all of said predetermined number of said channel bits when a corresponding bit is 0; and b2) assigning said highest power level to at least one of said predetermined number of said channel bits and assigning said lowest power level to at least one of said predetermined number of said channel bits when a corresponding bit is 1 and an immediately preceding bit is 1.

4. The method as claimed in claim 3, wherein said step b) further comprises b3) assigning said intermediate power level to a series of one or more channel bits at a beginning of said predetermined number of said channel bits, assigning said highest power level to a series of one or more channel bits following said intermediate power level, and assigning said lowest power level to the rest of said predetermined number of said channel bits when a corresponding bit is 1 and an immediately preceding bit is 0, and wherein said step b2) assigns said highest power level to a series of one or more channel bits of said predetermined number of said channel bits and assigns said lowest power level to the rest of said predetermined number of said channel bits when a corresponding bit is 1 and an immediately preceding bit is 1.

5. The method as claimed in claim 3, wherein said step b) further comprises b3) assigning said intermediate power level to a series of one or more channel bits at a beginning of said predetermined number of said channel bits and assigning said highest power level to the rest of said predetermined number of said channel bits when a corresponding bit is 1 and an immediately preceding bit is 0, and wherein said step b2) assigns said highest power level to a series of one or more channel bits at a beginning of said predetermined number of said channel bits and assigns said lowest power level to the rest of said predetermined number of said channel bits when a corresponding bit is 1 and an immediately preceding bit is 1.

6. The method as claimed in claim 3, wherein said step b) further comprises b3) assigning said intermediate power level to a series of one or more channel bits at a beginning of said predetermined number of said channel bits and assigning said highest power level to the rest of said predetermined number of said channel bits when a corresponding bit is 1 and an immediately preceding bit is 0, and wherein said step b2) assigns said highest power level to one of said predetermined number of said channel bits and assigns said lowest power level to the rest of said predetermined number of said channel bits when a corresponding bit is 1 and an immediately preceding bit is 1.

7. The method as claimed in claim 3, wherein said predetermined number of said channel bits is two.

8. The method as claimed in claim 7, wherein said step b2) assigns said highest power level to a beginning channel bit of said predetermined number of said channel bits and assigns said lowest power level to an ending channel bit of said predetermined number of said channel bits when a corresponding bit is 1 and an immediately preceding bit is 1.

9. The method as claimed in claim 8, wherein said step b) further comprises b3) assigning at least one of said intermediate power level and said highest power level to said predetermined number of said channel bits when a corresponding bit is 1 and an immediately preceding bit is 0.

10. The method as claimed in claim 8, wherein said step b) further comprises b3) assigning said intermediate power level to a beginning channel bit of said predetermined number of said channel bits and assigning said highest power level to an ending channel bit of said predetermined number of said channel bits when a corresponding bit is 1 and an immediately preceding bit is 0.

11. A method of recording a bit stream on a Phase Change media using a PWM method by illuminating a laser beam on said Phase Change media to overwrite previous records directly with said bit stream, said method comprising the steps of:

a) assigning a predetermined number of channel bits to each bit of said bit stream;

b) storing a plurality of arrangements of a highest power level, an intermediate power level, and a lowest power level of said laser beam assigned to said predetermined number of said channel bits, wherein said arrangements depend on values of a given one bit of said bit stream and an immediately preceding bit, first characteristic of said Phase Change media, second characteristics of said laser beam, and conditions for recording said bit stream; and c) selecting one of said arrangements for said given bit based on said values, said first characteristics, said second characteristics, and said conditions so as to modulate said laser said beam, said arrangement controlling at least a falling speed of temperature of said Phase Change media so that said Phase Change media is made into one of a crystalline state or an amorphous state to form a mark having a desired length and width.

12. The method as claimed in claim 11 wherein said highest power level, said intermediate power level, and said lowest power level of said laser beam also depend on said first characteristics, said second characteristics, and said conditions.

13. The method as claimed in claim 11, wherein a time length of said each bit of said bit stream is as long as that of each of said channel bits times said predetermined number of said channel bits.

14. The method as claimed in claim 11, wherein said step b) comprises:

b1) assigning said intermediate power level to all of said predetermined number of said channel bits when a corresponding bit is 0; and b2) assigning said highest power level to at least one of said predetermined number of said channel bits and assigning said lowest power level to at least one of said predetermined number of said channel bits when a corresponding bit is 1 and an immediately preceding bit is 1.

15. The method as claimed in claim 14, wherein said step b) further comprises b3) assigning said intermediate power level to a series of one or more channel bits at a beginning of said predetermined number of said channel bits, assigning said highest power level to a series of one or more channel bits following said intermediate power level, and assigning said lowest power level to the rest of said predetermined number of said channel bits when a corresponding bit is 1 and an immediately preceding bit is 0, and wherein said step b2) assigns said highest power level to a series of one or more channel bits of said predetermined number of said channel bits and assigns said lowest power level to the rest of said predetermined number of said channel bits when a corresponding bit is 1 and an immediately preceding bit is 1.

16. The method as claimed in claim 14, wherein said step b) further comprises b3) assigning said intermediate power level to a series of one or more channel bits at a beginning of said predetermined number of said channel bits and assigning said highest power level to the rest of said predetermined number of said channel bits when a corresponding bit is 1 and an immediately preceding bit is 0, and wherein said step b2) assigns said highest power level to a series of one or more channel bits at a beginning of said predetermined number of said channel bits and assigns said lowest power level to the rest of said predetermined number of said channel bits when a corresponding bit is 1 and an immediately preceding bit is 1.

17. The method as claimed in claim 14, wherein said step b) further comprises b3) assigning said intermediate power level to a series of one or more channel bits at a beginning of said predetermined number of said channel bits and assigning said highest power level to the rest of said predetermined number of said channel bits when a corresponding bit is 1 and an immediately preceding bit is 0, and wherein said step b2) assigns said highest power level to one of said predetermined number of said channel bits and assigns said lowest power level to the rest of said predetermined number of said channel bits when a corresponding bit is 1 and an immediately preceding bit is 1.

18. The method as claimed in claim 14, wherein said predetermined number of said channel bits is two.

19. The method as claimed in claim 18, wherein said step b2) assigns said highest power level to a beginning channel bit of said predetermined number of said channel bits and assigns said lowest power level to an ending channel bit of said predetermined number of said channel bits when a corresponding bit is 1 and an immediately preceding bit is 1.

20. The method as claimed in claim 19, wherein said step b) further comprises b3) assigning at least one of said intermediate power level and said highest power level to said predetermined number of said channel bits when a corresponding bit is 1 and an immediately preceding bit is 0.

21. A device for recording a bit stream on a Phase Change media using a PWM method by illuminating a laser beam on said Phase Change media to overwrite previous records directly with said bit stream, said device comprising;

first means for assigning a predetermined number of channel bits to each bit of said bit stream; and second means for assigning one of a highest power level, an intermediate power level, and a lowest power level of said laser beam to each of said channel bits so as to modulate said laser beam, wherein an arrangement of said highest power level, said intermediate power level, and said lowest power level for one bit of said bit stream depends on values of said one bit and an immediately preceding bit, said arrangement controlling at least a falling speed of temperature of said Phase Change media so that said Phase Change media is made into one of a crystalline state or an amorphous state to form a mark having a desired length and width.

22. The device as claimed in claim 21, wherein a time length of said each bit of said bit stream is as long as that of each of said channel bits times said predetermined number of said channel bits.

23. The device as claimed in claim 21, wherein said second means comprises:

third means for assigning said intermediate power level to all of said predetermined number of said channel bits when a corresponding bit is 0; and fourth means for assigning said highest power level to at least one of said predetermined number of said channel bits and assigning said lowest power level to at least one of said predetermined number of said channel bits when a corresponding bit is 1 and an immediately preceding bit is 1.

24. The device as claimed in claim 23, wherein said second means further comprises fifth means for assigning said intermediate power level to a series of one or more channel bits at a beginning of said predetermined number of said channel bits, assigning said highest power level to a series of one or more channel bits following said intermediate power level, and assigning said lowest power level to the rest of said predetermined number of said channel bits when a corresponding bit is 1 and an immediately preceding bit is 0, and wherein said fourth means assigns said highest power level to a series of one or more channel bits of said predetermined number of said channel bits and assigns said lowest power level to the rest of said predetermined number of said channel bits when a corresponding bit is 1 and an immediately preceding bit is 1.

25. The device as claimed in claim 23, wherein said second means further comprises fifth means for assigning said intermediate power level to a series of one or more channel bits at a beginning of said predetermined number of said channel bits and assigning said highest power level to the rest of said predetermined number of said channel bits when a corresponding bit is 1 and an immediately preceding bit is 0, and wherein said fourth means assigns said highest power level to a series of one or more channel bits at a beginning of said predetermined number of said channel bits and assigns said lowest power level to the rest of said predetermined number of said channel bits when a corresponding bit is 1 and an immediately preceding bit is 1.

26. The device as claimed in claim 23, wherein said second means further comprises fifth means for assigning said intermediate power level to a series of one or more channel bits at a beginning of said predetermined number of said channel bits and assigning said highest power level to the rest of said predetermined number of said channel bits when a corresponding bit is 1 and an immediately preceding bit is 0, and wherein said fourth means assigns said highest power level to one of said predetermined number of said channel bits and assigns said lowest power level to the rest of said predetermined number of said channel bits when a corresponding bit is 1 and an immediately preceding bit is 1.

27. The device as claimed in claim 23, wherein said predetermined number of said channel bits is two.

28. The device as claimed in claim 27, wherein said fourth means assigns said highest power level to a beginning channel bit of said predetermined number of said channel bits and assigns said lowest power level to an ending channel bit of said predetermined number of said channel bits when a corresponding bit is 1 and an immediately preceding bit is 1.

29. The device as claimed in claim 28, wherein said second means further comprises fifth means for assigning at least one of said intermediate power level and said highest power level to said predetermined number of said channel bits when a corresponding bit is 1 and an immediately preceding bit is 0.

30. The device as claimed in claim 28, wherein said second means further comprises fifth means for assigning said intermediate power level to a beginning channel bit of said predetermined number of said channel bits and assigning said highest power level to an ending channel bit of said predetermined number of said channel bits when a corresponding bit is 1 and an immediately preceding bit is 0.

31. A device for recording a bit stream on a Phase Change media using a PWM method by illuminating a laser beam on said Phase Change media to overwrite previous records directly with said bit stream, said device comprising:

19 first means for assigning a predetermined number of channel bits to each bit of said bit stream;

second means for storing a plurality of arrangements of a highest power level, an intermediate power level, and a lowest power level of said laser beam assigned to said predetermined number of said channel bits, wherein said arrangements depend on values of a given one bit of said bit stream and an immediately preceding bit, first characteristics of said Phase Change media, second characteristics of said laser beam, and conditions for recording said bit stream; and selection means for selecting one of said arrangements for said given bit based on said values, said first characteristics, said second characteristics, and said conditions so as to modulate said laser beam, said arrangement controlling at least a falling speed of temperature of said Phase Change media so that said Phase Change media is made into one of a crystalline state or an amorphous state to form a mark having a desired length and width.

32. The device as claimed in claim 31 wherein said highest power level, said intermediate power level, and said lowest power level of said laser beam also depend on said first characteristics, said second characteristics, and said conditions.

33. The device as claimed in claim 31, wherein a time length of said each bit of said bit stream is as long as that of each of said channel bits times said predetermined number of said channel bits.

34. The device as claimed in claim 31, wherein second means comprises:

third means for assigning said intermediate power level to all of said predetermined number of said channel bits when a corresponding bit is 0; and fourth means for assigning said highest power level to at least one of said predetermined number of said channel bits and assigning said lowest power level to at least one of said predetermined number of said channel bits when a corresponding bit is 1 and an immediately preceding bit is 1.

35. The device as claimed in claim 34, wherein said second means further comprises fifth means for assigning said intermediate power level to a series of one or more channel bits at a beginning of said predetermined number of said channel bits, assigning said highest power level to a series of one or more channel bits following said intermediate power level, and assigning said lowest power level to the rest of said predetermined number of said channel bits when a corresponding bit is 1 and an immediately preceding bit is 0, and wherein said fourth means assigns said highest power level to a series of one or more channel bits of said predetermined number of said channel bits and assigns said lowest power level to the rest of said predetermined number of said channel bits when a corresponding bit is 1 and an immediately preceding bit is 1.

36. The device as claimed in claim 34, wherein said second means further comprises fifth means for assigning said intermediate power level to a series of one or more channel bits at a beginning of said predetermined number of said channel bits and assigning said highest power level to the rest of said predetermined number of said channel bits when a corresponding bit is 1 and an immediately preceding bit is 0, and wherein said fourth means assigns said highest power level to a series of one or more channel bits at a beginning of said

20 predetermined number of said channel bits and assigns said lowest power level to the rest of said predetermined number of said channel bits when a corresponding bit is 1 and an immediately preceding bit is 1.

37. The device as claimed in claim 34, wherein said second means further comprises fifth means for assigning said intermediate power level to a series of one or more channel bits at a beginning of said predetermined number of said channel bits and assigning said highest power level to the rest of said predetermined number of said channel bits when a corresponding bit is 1 and an immediately preceding bit is 0, and wherein said fourth means assigns said highest power level to one of said predetermined number of said channel bits and assigns said lowest power level to the rest of said predetermined number of said channel bits when a corresponding bit is 1 and an immediately preceding bit is 1.

38. The device as claimed in claim 34, wherein said predetermined number of said channel bits is two.

39. The device as claimed in claim 38, wherein said fourth means assigns said highest power level to a beginning channel bit of said predetermined number of said channel bits and assigns said lowest power level to an ending channel bit of said predetermined number of said channel bits when a corresponding bit is 1 and an immediately preceding bit is 1.

40. The device as claimed in claim 39, wherein said second means further comprises fifth means for assigning at least one of said intermediate power level and said highest power level to said predetermined number of said channel bits when a corresponding bit is 1 and an immediately preceding bit is 0.

41. A device for recording a bit stream using a PWM method by overwriting previous records directly with said bit stream, said device comprising:

a Phase Change media;

a media driving unit rotating said Phase Change media;

a laser source emitting a laser beam which is illuminated upon said Phase Change media to record said bit stream; and a laser driving unit driving said laser source, said laser driving unit comprising:

first means for assigning a predetermined number of channel bits to each bit of said bit stream; and second means for assigning one of a highest power level, an intermediate power level, and a lowest power level of said laser beam to each of said channel bits so as to modulate said laser beam.

wherein an arrangement of said highest power level, said intermediate power level, and said lowest power level for one bit of said bit stream depends on values of said one bit and an immediately preceding bit, said arrangement controlling at least a falling speed of temperature of said Phase Change media so that said Phase Change media is made into one of a crystalline state or an amorphous state to form a mark having a desired length and width.

42. The device as claimed in claim 41, wherein said second means comprises:

third means for assigning said intermediate power level to all of said predetermined number of said channel bits when a corresponding bit is 0; and fourth means for assigning said highest power level to at least one of said predetermined number of said channel bits and assigning said lowest power level to at least one of said predetermined number of said channel bits when a corresponding bit is 1 and an immediately preceding bit is 1.

43. A device for recording a bit stream using a PWM method by overwriting previous records directly with said bit stream, said device comprising:

a Phase Change media;

a media driving unit rotating said Phase Change media;

a laser source emitting a laser beam which is illuminated upon said Phase Change media to record said bit stream; and a laser driving unit driving said laser source, said laser driving unit comprising:

first means for assigning a predetermined number of channel bits to each bit of said bit stream;

second means for storing a plurality of arrangements of a highest power level, an intermediate power level, and a lowest power level of said laser beam assigned to said predetermined number of said channel bits, wherein said arrangements depend on values of a given one bit of said bit stream and an immediately preceding bit, first characteristics of said Phase Change media, second characteristics of said laser beam, and conditions for recording said bit stream, and selection means for selecting one of said arrangements for said given bit based on said values, and first characteristics, said second characteristics, and said conditions so as to modulate said laser beam, said arrangement controlling at least a falling speed of temperature of said Phase Change media so that said Phase Chance media is made into one of a crystalline state or an amorphous state to form a mark having a desired length and width.

44. The device as claimed in claim 43, wherein said second means comprises:

third means for assigning said intermediate power level to all of said predetermined number of said channel bits when a corresponding bit is 0; and fourth means for assigning said highest power level to at least one of said predetermined number of said channel bits and assigning said lowest power level to at least one of said predetermined number of said channel bits when a corresponding bit is 1 and an immediately preceding bit is 1.

* * * * *